United States Patent [19]

Sakamoto

[11] Patent Number: 4,589,620

[45] Date of Patent: May 20, 1986

[54] SEAT WITH AN AIR SUSPENSION

[75] Inventor: Takao Sakamoto, Akishima, Japan

[73] Assignee: Tachikawa Spring Co., Ltd., Tokyo, Japan

[21] Appl. No.: 563,441

[22] Filed: Dec. 20, 1983

[51] Int. Cl.⁴ ............................................. A47C 3/30
[52] U.S. Cl. .................................. 248/550; 248/588; 361/176; 250/561
[58] Field of Search .................. 248/550, 588, 631; 297/338, 339, 345, 347; 250/231 P, 231 R, 561; 307/117; 361/176, 177

[56] References Cited

U.S. PATENT DOCUMENTS

| | | | |
|---|---|---|---|
| 2,147,421 | 2/1939 | Bendz | 250/561 |
| 4,020,358 | 4/1977 | Wyland | 307/117 |
| 4,198,025 | 4/1980 | Lowe | 318/484 |
| 4,321,451 | 3/1982 | Inoue | 318/603 |

Primary Examiner—J. Franklin Foss
Assistant Examiner—Robert A. Olson
Attorney, Agent, or Firm—Cushman Darby & Cushman

[57] ABSTRACT

An improved seat with an air suspension is disclosed in which detector means, a control circuit and electromagnetic valves are cooperatively used to operate the air suspension so as to automatically control the amount of air to be contained within the air suspension according to the weights of different occupants of the seat. Outputs from the detection means for detecting the vertical displacements of the seat are inputted to the control circuit and held therein for a predetermined period of time before the control circuit is operated to control the amount of air to be contained within the air suspension.

7 Claims, 4 Drawing Figures

SEAT WITH AN AIR SUSPENSION

BACKGROUND OF THE INVENTION

1. Field of the Invention

The present invention relates to a seat with an air suspension and in particular to a seat with an air suspension which is capable of automatic height adjustment depending upon the weight of an occupant of such seat.

2. Description of the Prior Art

A conventional vehicle seat is well known that is provided with an air suspension for maintaining the height of the seat at a predetermined level regardless of the weight of an occupant.

In such a conventional seat with an air suspension, the air to be charged into the air suspension is manually adjusted, or alternatively an air valve is mounted to pantographic links provided between a seat frame and a lower suspension on a vehicle floor, and when the air valve is lowered down to a predetermined position the air valve is butted against a stopping portion and a switch valve is opened to discharge air into the air suspension, so that the height of such seat can be held in the predetermined level independent of the weight of the occupant.

However, the conventional seat with an air suspension of the manual operation type is typically found poor in operability and difficult to adjust properly. On the other hand, in case of the type using the air valve to be opened or closed mechanically, the switch valve or other components are larger in size and thus installation and adjustment operations of such seat are more complicated.

SUMMARY OF THE INVENTION

A seat with an air suspension constructed in accordance with the invention eliminates the drawbacks found in the prior art seat with an air suspension.

Accordingly, the principal object of the present invention is to provide a seat with an air suspension for vehicles or airplanes which is capable of automatic and accurate adjustments depending on the weight of an occupant.

Another object of the invention is to provide a seat with an air suspension which can be compactly designed as well as can be simply installed and adjusted.

In order to achieve the above objectives, a new and improved seat with an air suspension is provided, wherein an output from a detection means for detecting the vertical displacement of the seat is inputted into a control means and is held for given periods of time therein before it is used to automatically control air to be charged into the air suspension means.

The detection means employed in the present invention may be semiconductors such as light emitting elements and light receiving elements; differential transformers; inductance-type detectors; capacitive detectors; and, potentiometers.

The seat of the invention is installed such that it can be moved vertically by means of X-shaped pantographic links and the air suspension is located between an upper suspension frame provided on the bottom surface side of the seat and a lower suspension frame provided on the side of a vehicle floor. The air suspension is connected to an air feed pipe and an exhaust pipe respectively provided with an electro-magnetic valve, with the air feed pipe being connected to a compressor.

Each electro-magnetic valve is controlled by means of a control circuit, and this control circuit is adapted such that it can be operated only when the output of the detector means is inputted and held for a predetermined period of time therein and thus it is prevented from malfunctions when the vehicle travels upon bad roads.

BRIEF DESCRIPTION OF THE DRAWINGS

This invention will be explained with reference to the accompanying drawings which illustrate preferred embodiments of the present invention.

DETAILED DESCRIPTION OF PREFERRED EMBODIMENTS OF THE PRESENT INVENTION

Figure 1:
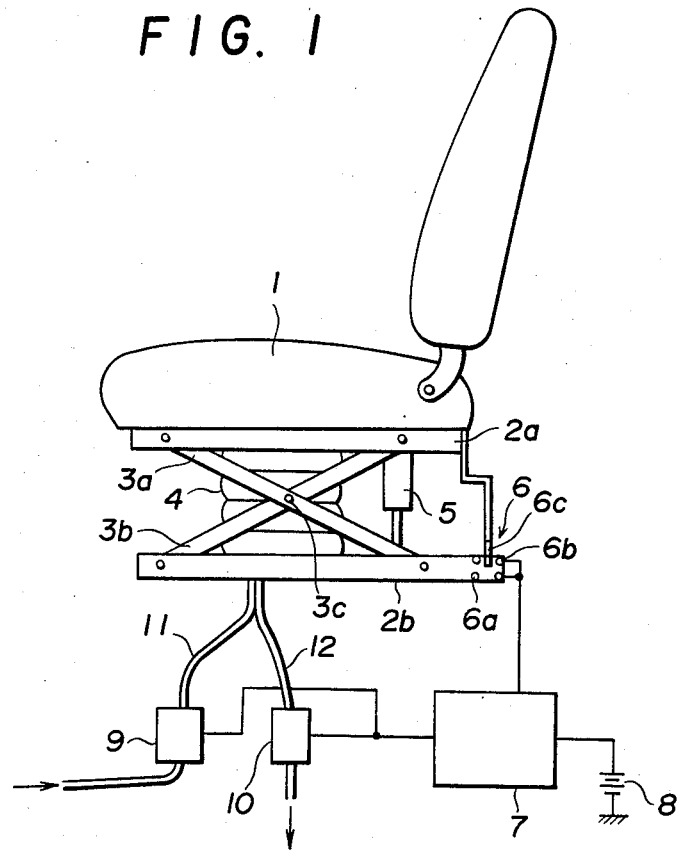
FIG. 1 is a diagrammatic side elevation of a seat with an air suspension constructed in accordance with the present invention.

FIG. 1 illustrates a side elevation of a seat with an air suspension constructed in accordance with the present invention. A seat frame provided on the side of the lower surface of a seat (1) is fixed onto an upper suspension frame (2a), while a lower suspension frame (2b) is fixed to a vehicle floor or the like. Between the upper suspension frame (2a) and the lower suspension frame (2b) are provided X-shaped pantographic links (3a),(3b). One end of the first link (3a) is pivotally mounted to the end of the upper suspension frame (2a) and the other end thereof is pivoted to the end of the lower suspension frame (2b). The second link (3b) is mounted intersectingly with the first link (3a) such that one end thereof is pivotally connected to the other end of the upper suspension frame (2a) with the other end thereof being connected in a pivotal manner to the other end of the lower suspension frame (2b). The first and second links (3a) and (3b) are pivotally interconnected to one another at point (3c). The seat (1) is composed of a cushion member such as a foam material placed on the seat frame and covered with a top layer.

Between the upper and lower suspension frames (2a) and (2b) there is also provided an air suspension (4). This air suspension (4) is composed of, for example, bellow-like air springs, and is connected with an air feed pipe (11) and an exhaust pipe (12). Thus, air can be charged from a compressor into the air suspension (4) by means of an electro-magnetic inlet valve (9) through the air feed pipe (11), while air present in the air suspension is discharged from the exhaust pipe (12) by means of the electro-magnetic exhaust valve (10) into the ambient air. Electro-magnetic valves (9)(10) are controlled by means of a control circuit (7) such that they are normally closed and are opened when energized. Control circuit (7) is driven by means of a power supply (8) for a vehicle or the like. Between the lower and upper suspension frames (2b) and (2a) there is further provided a height detector (6). the detector includes light-emitting elements (6a)(6a') and light receiving elements (6b)(6b') fixed to the lower suspension frame (2b) and a shield plate (6c) fixed to the upper suspension frame (2a).

Reference numeral (5) denotes a shock absorber such as a dash dot provided between the upper and lower suspension frames (2a) and (2b).

Figure 2:
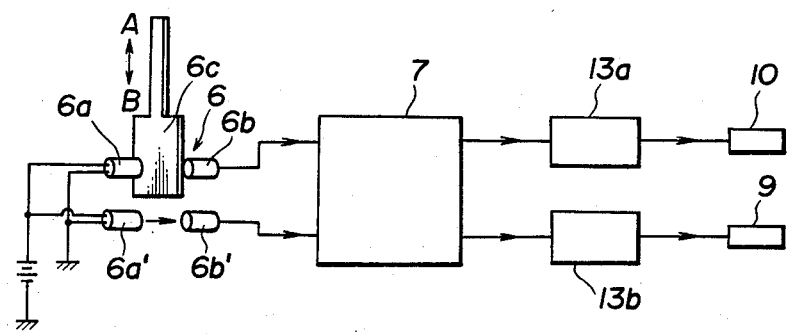
FIG. 2 is a flow diagram for operating an electro-magnetic valve by means of a signal from the detection means of the invention.

FIG. 2 illustrates an embodiment of the invention including the detector (6), control circuit (7) and electro-magnetic valves (9)(10). The detector (6) comprises semi-conductor light emitting elements (6a)(6a') each composed of an LED or the like and semi-conductor light receiving elements (6b)(6b') each composed of a phototransistor. The semi-conductor light emitting and receiving elements (6a)(6a') and (6b)(6b') are positioned so as to be in opposing relationship to one another with the shield plate (6c) interposed therebetween.

Figure 3:
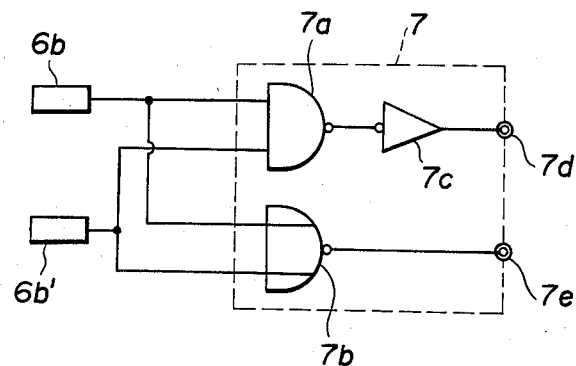
FIG. 3 is a circuit diagram illustrating an embodiment of the control circuit shown in FIG. 2; and, FIG. 4 is a flow diagram illustrating another embodiment of the invention.

Shield plate (6c) can be vertically movable according to the weight of the seat occupant, as shown by arrows A and B in FIG. 2. Specifically, while the light receiving elements (6b)(6b') are receiving light from the light emitting elements (6a)(6a'), since the shield plate (6c) is situated in its uppermost position, as shown in FIG. 3, the outputs of the light receiving elements (6b)(6b') are "1" "1" and the output of NAND circuit (7a) is "0". If this output is applied to NOT circuit (7c), then the NOT circuit outputs a logic "1" which causes the electro-magnetic valve (10) to be opened by means of electro-magnetic valve drive circuit (13a), so that the air present in the air suspension (4) can be exhausted into the air (12).

When the outputs of the light receiver (6b)(6b') are "1" "0", respectively, the out-put of NAND circuit (7a) is "1". In this case, however, the output of NOT circuit (7c) becomes "0" and the inputs of the "1" "0" applied to NOR circuit (7b) are "0". Therefore, no outputs will be applied to the NOR circuit (7b).

Next, when the rays from the light emitting elements (6a)(6a') are completely shut off by the shield plate (6c), the seat (1) will be located in its lowermost position. Thus, since the outputs of the light receiving elements (6b)(6b') are "0" and "0" respectively, the output of NOR circuits (7e) will be "1" to open the electro-magnetic valve (9) by means of the electro-magnetic valve drive circuit (13b), so that air will be supplied from the air compressor into the air suspension (4) and thus the seat (1) will be moved upward correspondingly.

Figure 4:
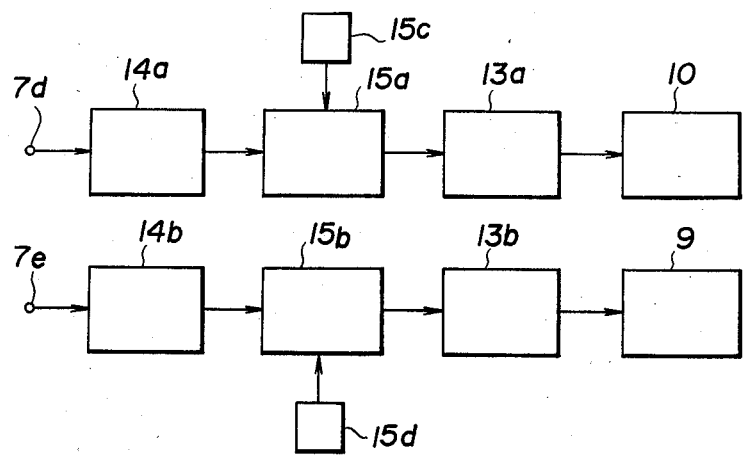

As shown in FIG. 4, after the outputs (7d)(7e) of the control circuit (7) are inputted to wave forming circuits (14a)(14b) such as Schmidt circuits and then the outputs of these wave forming circuits are inputted to counter circuits (15a)(15b) respectively, the outputs from these counter circuits are compared with the reference counters (15c)(15d) of a preset counter so as to select signals that are produced at such time as corresponds to the time to be determined by these reference counters. If the selected signals are used to operate the electro-magnetic valve drive circuits (13a)(13b) and thus the electro-magnetic valves (9)(10), then it is possible to neglect the vertical displacements of the shield plate (6c) in transit. Thus, it is possible to actuate the electro-magnetic valves only when a given output has been input to and held in the control circuit for a predetermined period of time that is determined by means of presetting of the counter circuits.

Although in the illustrated embodiment the light emitting and receiving semi-conductor elements are used as detection means, it is easily understood by those skilled in the art that such detection means may be composed of differential transformers, inductance-type detectors, capacitive detectors, potentiometers or the like. It is also clear that various changes of the control circuit are also possible within the scope of the invention.

As the invention is constructed in the above manner, the detector elements of the invention can be very small in size and the setting of initiation of the electro-magnetic valves is not so critical as in case of mechanical structures. Also, the electro-magnetic valves permit automatic adjustment of the height of the seat. Further, since the electro-magnetic valves can be operated only when the outputs of the detection elements have been for a given period of time, the can be made insensitive to heavy vibrations which may occur in bad roads.

What is claimed is:

1. A vehicle seat comprising:
   an upper seat frame adapted to support a seat occupant;
   a lower seat frame adapted to be fixed to a floor of the vehicle;
   coupling means for interconnecting said upper and lower seat frames to permit said upper seat frame to be movable relative to said lower seat frame between raised and lowered positions;
   an air suspension system including air inlet means for introducing pressurized air to responsively raise said upper seat frame in a direction towards said raised position and air discharge means for discharging air to responsively lower said upper seat frame in a direction towards said lower position;
   height adjustment means operatively connected to said air inlet and air discharge means for automatically adjusting the height of said vehicle seat to a predetermined normal position intermediate of said raised and lowered positions, said height adjustment means having detector means for detecting whether said seat is in said raised or lowered positions and to effect correction of said seat height by moving said upper seat frame into said normal position, said detector means including
   (a) upper and lower detectors each including light-emitting means for emitting light and light-receiving means, spaced from and in opposing registry with said light-emitting means, for receiving said emitted light and for generating an output signal in response thereto; and
   (b) light shield means fixed to said upper seat frame so to be movable within the space defined between each said opposing light-emitting and light-receiving means to shield said light-receiving means from said emitted light of said opposing light-emitting means to prevent said light-receiving means from generating said output signal;
   said height adjustment means further including circuit means operatively coupled to said air inlet and outlet means and to said detector means for receiving said outputs from each said light-receiving means, said circuit means including first logic gate means for issuing a first command to said air discharge means only in response to receiving an output signal from both said light-receiving means of said upper and lower light detectors to thereby discharge air from said air suspension means and thus lower said vehicle seat, and second logic gate means for issuing a second command signal to said air inlet means only in response to an absence of output signals from said light-receiving means of said upper and lower light detectors to thereby introduce air into said air suspension means to thereby raise said vehicle seat;

wherein said first gate means includes NAND gate means for outputting a logic zero in response to receiving an output signal from said light-receiving means of both said upper and lower light detectors, and inverting means for inverting said logic zero outputted from said NAND gate means to a logic one whereby said air discharge means is operated.

2. A vehicle seat as in claim 1 wherein said second gate means is a NOR gate means for outputting a logic zero when either one of said light-receiving means of said upper and lower light detectors generates an output signal and for outputting said command signal when neither one of said light-receiving means of said upper and lower light detectors generates an output signal.

3. A vehicle seat as in claim 1 wherein said air inlet means includes compressor means for providing a source of pressurized air and normally closed inlet valve means which opens in response to receiving said second command signal.

4. A vehicle seat as in claim 3 wherein said air discharge means includes normally closed discharge valve means which opens in response to receiving said first command signal.

5. A vehicle seat as in claim 1 wherein said circuit means further includes:

wave forming circuit means for forming a digitalized output in response to receiving said first or second commmand signals;

counter/comparator means for counting said digitalized output of said wave forming circuit means to generate a time signal and for comparing said generated time signal to a reference signal so as to output a drive signal when said time signal exceeds said reference signal to responsively activate said air inlet or air discharge means based upon a time-delay established by said reference signal.

6. A vehicle seat as in claim 1 wherein each said light-emitting means is a light-emitting diode.

7. A vehicle seat as in claim 1 wherein said air suspension system further includes bellow-type air springs provided between said upper seat frame and said lower seat frame.

* * * * *